US007005603B2

(12) United States Patent
Addington et al.

(10) Patent No.: US 7,005,603 B2
(45) Date of Patent: Feb. 28, 2006

(54) LASER MARKING

(75) Inventors: Cary G. Addington, Albany, OR (US); Timothy S. Hubley, Corvallis, OR (US); Quoc Huynh, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 148 days.

(21) Appl. No.: 10/817,134

(22) Filed: Apr. 2, 2004

(65) Prior Publication Data

US 2005/0224578 A1 Oct. 13, 2005

(51) Int. Cl.
*B23K 26/00* (2006.01)
*B41J 2/44* (2006.01)
*B41J 2/455* (2006.01)

(52) U.S. Cl. ............................ 219/121.69; 219/121.76

(58) Field of Classification Search ............ 219/121.6, 219/121.61, 121.62, 121.65, 121.66, 121.68, 219/121.69, 121.76, 121.77, 121.85
See application file for complete search history.

(56) References Cited

U.S. PATENT DOCUMENTS

| | | | | |
|---|---|---|---|---|
| 4,522,656 | A | 6/1985 | Kuhn-Kuhnenfeld et al. | |
| 4,654,290 | A | 3/1987 | Spanjer | |
| 4,847,181 | A * | 7/1989 | Shimokawa | 430/297 |
| 4,922,077 | A | 5/1990 | Gordon | |
| 5,061,341 | A | 10/1991 | Kildal et al. | |
| 5,075,195 | A | 12/1991 | Babler et al. | |
| 5,175,425 | A | 12/1992 | Spratte et al. | |
| 5,463,200 | A | 10/1995 | James et al. | |
| 5,664,497 | A | 9/1997 | Zuniga et al. | |
| 5,719,372 | A | 2/1998 | Togari et al. | |
| 5,855,969 | A | 1/1999 | Robertson | |
| 5,897,938 | A | 4/1999 | Shinmoto et al. | |
| 5,977,514 | A | 11/1999 | Feng et al. | |
| 6,017,972 | A | 1/2000 | Harris et al. | |
| 6,022,905 | A | 2/2000 | Harris et al. | |
| 6,576,862 | B1 | 6/2003 | Costin et al. | |
| 6,627,299 | B1 | 9/2003 | Feng et al. | |
| 6,749,933 | B2 * | 6/2004 | Dries et al. | 428/328 |

FOREIGN PATENT DOCUMENTS

| | | |
|---|---|---|
| JP | 2000-312983 | 11/2000 |
| JP | 2002-205178 | 7/2002 |

* cited by examiner

*Primary Examiner*—Samuel M. Heinrich

(57) ABSTRACT

A method for marking a polymeric surface includes directing a first laser beam on the surface to form a lightened area on the surface and directing a second laser beam upon the lightened area to form a mark darker than the lightened area.

24 Claims, 6 Drawing Sheets

LASER MARKING

BACKGROUND OF THE INVENTION

Most of today's products or product parts include identification marks to assist in part or product tracking, inventory management and point of sale pricing and data collection. Common two-dimensional identification marking schemes include stickers attached to the part or product and inkjet marking. Identification stickers must be inventoried, require application to the part or product and are susceptible to being separated from the part or product. Inkjet identification marks require the consumption of ink, printhead replacement and maintenance, and process time for drying of the ink.

As an alternative to stickers and inkjet marking, lasers have been employed to form identification marks on products. Such marks are commonly used to form a dark mark on a lighter colored plastic or a light mark on a dark colored plastic. Unfortunately, such laser produced identification marks frequently lack sufficient contrast for being reliably read by many optical reading devices such as handheld scanners. Moreover, such laser-produced identification marks frequently become damaged or scratched, further impeding a reliable reading of the identification marks.

SUMMARY OF THE INVENTION

According to one exemplary embodiment, a method is disclosed for marking a polymeric surface. The method includes directing a first laser beam on the surface to form a lightened area on the surface and directing a second laser beam upon the lightened area to form a mark darker than the lightened area.

DETAILED DESCRIPTION OF EXAMPLE EMBODIMENTS

Figure 1:
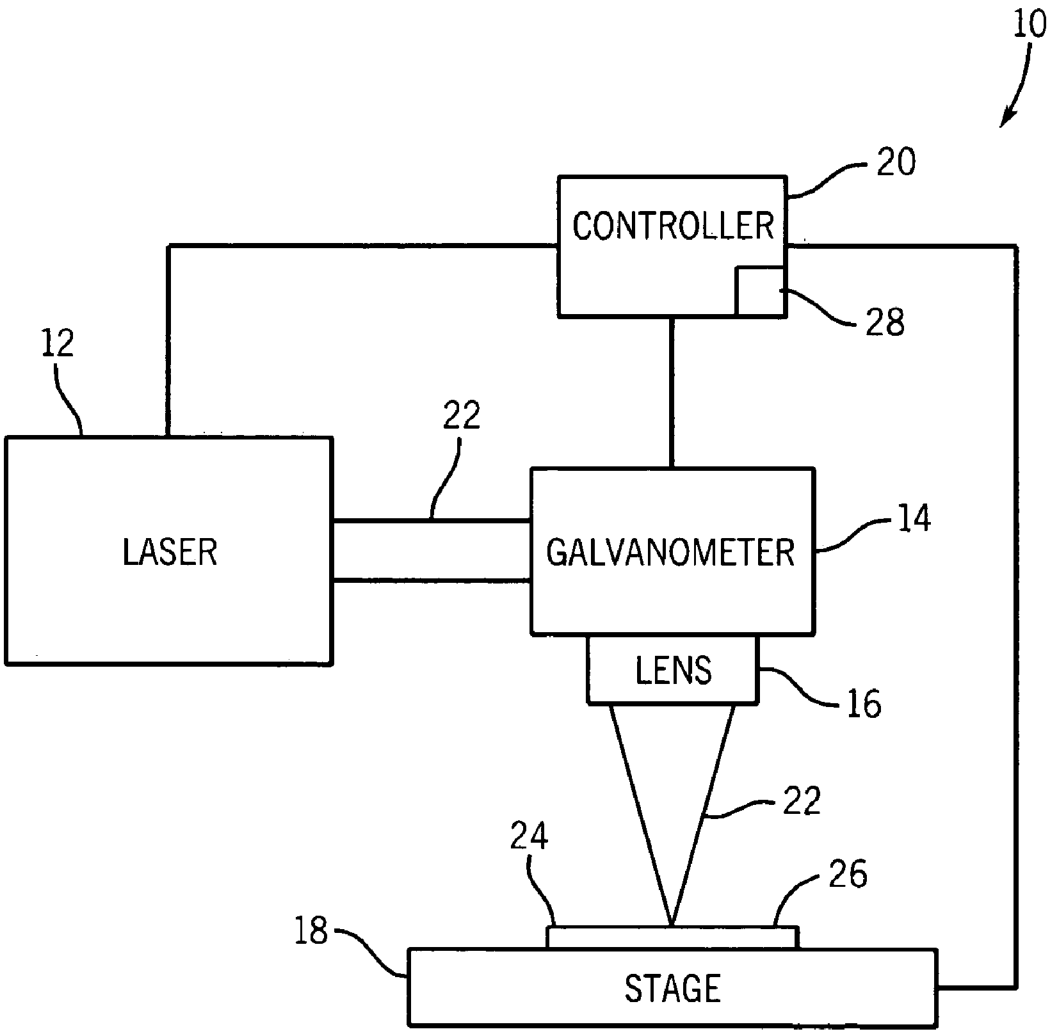
FIG. 1 is a schematic illustration of an article marking system according to an exemplary embodiment.

FIG. 1 schematically illustrates an example embodiment of an article marking system 10 which generally includes laser 12, galvanometer 14, lens 16, stage 18 and controller 20. Laser 12 comprises a laser device configured to amplify light by stimulated emission of radiation to produce a laser beam 22 which is directed to galvanometer 14. Examples of lasers include, but are not limited to, solid state lasers, gas lasers or metal vapor lasers in either continuous wave, q-switched or pulsed or gated formats, and Excimer lasers. In particular, examples of lasers include Nd:YVO or YAG lasers (wavelength 1064 nm), frequency-doubled Nd:YVO or YAG lasers (wavelength 532 nm) and Excimer lasers (wavelength 193 nm–351 nm).

Galvanometer 14 comprises an X-Y mirror configured to direct laser beam 22 through lens 16. Lens 16 focuses laser beam 22 onto an object, article or part 24 supported by stage 18. Laser 12, galvanometer 14 and lens 16 are specifically configured to generate and direct a laser beam 22 configured to treat one or more materials along surface 26 of part 24 so as to lighten portions of surface 26 of part 24 or alternatively to darken portions of surface 26 of part 24.

Stage 18 generally comprises a structure configured to support part 24 as laser beam 22 is irradiating surface 26. In one embodiment, stage 18 comprises a stationery structure. In another embodiment, stage 18 is configured to move part 24. For example, stage 18 may be movably supported upon bearings, tracks, slides and the like and may be operably coupled to an actuator such as one or more hydraulic cylinders, pneumatic cylinders, electric solenoids and motor-driven actuators which move stage 18 in response to control signals received from controller 20. Although stage 18 is illustrated as a platform, stage 18 may have various sizes, shapes and configurations depending upon the configuration of part 24. In still other embodiments, stage 18 may be configured to be manually moved. In particular applications, stage 18 may be configured to grip or engage particular portions of part 24 so as to function as a fixture.

Controller 20 generally comprises a processor unit configured to generate control signals based upon a set of instructions 28 for the operation of one or more of laser 12, galvanometer 14 and stage 18. For purposes of the disclosure, the term "processor unit" shall include a conventionally known or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. Controller 20 is not limited to any specific combination of hardware circuitry and software, nor to any particular source for the instructions executed by the processing unit. In one particular embodiment, controller 20 generates control signals based in part upon instructions from computer or processor readable media 28, such as software provided by digital media, optical media, (e.g., CD, DVD) or magnetic media (floppy disk, tape, etc.). The instructions contained on media 28 cause laser 12, galvanometer 14 and stage 18 to cooperate with one another such that beam 22 is directed on surface 26 of part 24.

Surface 26 of part 24 is generally formed from a polymeric material configured to be lightened upon being irradiated by a laser beam and also configured to be darkened upon being irradiated by a laser beam. The polymeric material forming surface 26 generally includes one or more resins and one or more additives that absorb light in the visible range. To lighten the polymeric material, the surface 26 is irradiated with a selected power density (i.e., watts per second per $cm^2$) by a laser beam at a selected energy density (also known as fluence, i.e., Joules/$cm^2$) with a selected exposure time such that one or more additives are bleached or vaporized. This reduces the ability of those irradiated portions to absorb light, decreasing the darkness of those irradiated portions.

The same polymeric material is darkened by irradiating portions of surface 26 at a selected power density such that the polymeric resin itself is carbonized or burnt. The carbonized polymeric material absorbs visual light at a greater rate as compared to the raw polymeric material, causing such burnt portions to be darker. Examples of polymeric resins include, but are not limited to, noryl (such as, for example, the formulation known as noryl PPX630 produced by GE Plastics), liquid crystal polymer (LCP), polyethersulfone (PES), polyphenalsulfide (PES), polystyrene, polypropylene, polyethylene, polyethylene terephthalate (PET), polyvinylchloride (PVC) and acrylonitrile butadiene styrene (ABS). Examples of such additives include, but are not limited to, carbon black, graphite, calcium silicates, zirconium silicates, zeolite, mica, kaolin, talc and cordierite, which comprise laser energy absorbing additives. Other examples of additives include colorants such as organic pigments, inorganic pigments or polymer-compatible organic dyes.

During operation of laser marking system 10, controller 20 generates control signals based in part upon instructions from media 28 which cause laser 12, galvanometer 14 and stage 18 to cooperate with one another to irradiate surface 26 with a first laser beam 22 to form a lightened area and to irradiate the lightened area with a second laser beam 22' (shown in FIG. 5) to form at least one mark darker than the lightened area. In particular, to form the lightened area, controller 20 generates control signals such that surface 26 is irradiated with a first power density using laser beam 22. The first power density applied by laser beam 22 vaporizes or bleaches one or more of the additives of the polymeric material forming surface 26. To form darker marks upon the lightened area, controller 20 generates control signals such that portions of the previously lightened area are irradiated with a second greater power density from a second laser beam 22' (shown in FIG. 5).

Depending upon characteristics of the polymeric material forming surface 26, the energy density applied to the lightened area by laser beam 22' may be configured to either (1) vaporize, cut away or remove particular portions of surface 26 that have been lightened or (2) carbonize or burn the polymeric material, such as its resins or additives. By vaporizing, cutting away or removing portions of surface 26, the first method exposes the underlying raw or untreated polymeric material previously below the lightened layer along surface 26. The exposed polymeric material including the additives absorbs a greater amount of light as compared to the remaining surrounding lightened area on surface 26. As a result, the exposed raw or untreated polymeric material with additives forms dark marks within the lightened area.

By carbonizing or burning portions of the previously formed lightened area, the second method forms marks that have higher contrast with the lightened area. In particular, the energy density applied by the second laser beam is generally insufficient to burn or cut through the lightened area but it is sufficient to burn or char portions of the lightened area. These charred or burnt portions of the lightened area form marks that are darker than the surrounding lightened area that do not receive energy from the second laser beam.

With particular polymeric materials, to remove or burn selected portions of the previously lightened area of surface 26 requires the application of a greater power density by the second laser beam 22' (shown in FIG. 5) as compared to the previous first laser beam 22. The greater power density applied by the second laser beam as compared to the first laser beam is achieved by: (1) controller 20 generating control signals such that the second laser beam and surface 26 are moved relative to one another at a slower speed as compared to the movement of first laser beam 22 and surface 26 during treatment by the first laser beam to increase the exposure time of the surface to the second laser beam as compared to the first laser beam and thereby increase the power density applied by the second laser beam or (2) controller 20 generating control signals such that the second laser beam has a greater energy density or fluence as compared to the first laser beam. Controller 20 may generate control signals to cause the second laser beam to have a second greater energy density or fluence by increasing the power (i.e., watts per second) and/or a duty cycle (also known as modulation or frequency) of the second laser beam.

In one example embodiment, the polymeric material forming surface 26 comprises polymeric resin, stabilizers and carbon black. The ratio of carbon black is approximately one percent. Laser marking system 10 comprises a Nd:YAG laser having a wave length of 1064 nanometers. Laser 12 includes a Q-switch to vary the frequency of the laser beam generated by laser 12. Galvanometer 14 comprises an X-Y mirror while lens 16 comprises a telecentric F-Theta lens. Controller 20 generates control signals such that laser beam 22 has a power of 4.38 watts and a frequency of 60 kHz. Controller 20 further generates control signals such that laser beam 22 and/or stage 18 move relative to one another such that laser beam 22 traverses surface 26 at a speed of about 1500 millimeters per second in a raster to form a lightened area. To form the dark marks upon the lightened area, controller 20 generates control signals such that at least one of laser beam 22' (shown in FIG. 5) and stage 18 move relative to one such that laser beam 22' moves across the lightened area at a slower speed of about 350 millimeters per second. This results in dark marks being formed upon surface 26 over the lightened area.

In other embodiments, other lasers may be employed having different wave lengths. For example, lasers having wave lengths of between about 1000 nanometers and 1500 nanometers may be employed or carbon dioxide lasers may be employed having wave lengths of between 9.2 micrometers and 10.6 micrometers. In other embodiments, laser 12 may have a power of between about 1 watt and 50 watts. The resulting laser beam 22 or 22' may traverse surface 26 of part 24 during the formation of the lightened area or formation of the mark at a scanned speed of between about 100 millimeters per second and 4000 millimeters per second. In other embodiments, power, scan speed and frequency may be adjusted beyond such ranges, depending upon the polymeric material being marked and relative scan speeds, laser powers and laser frequencies.

The overall marking scheme or arrangement consisting of the lightened area and the overlying darkened mark or marks has improved contrast and angular viewability as compared to laser-formed marks formed upon an original surface 26 of part 24. In particular, the lightened area produced by the first laser beam 22 has consistent or uniform surface reflection qualities. Plastic mold surfaces change over time imparting changes in surface reflection characteristics. The lightened area of surface 26 bleached by the first laser beam 22 normalizes variations in surface reflections, glints and glares to provide consistent defuse contrast that are unencumbered by spurious environmental reflections.

In addition, because surface 26 is bleached or lightened as compared to the remainder of surface 26 which are not lightened, the lightened area of surface 26 has a greater contrast with the darkened marks formed thereon as compared to the surrounding unbleached portions of surface 26. This improved contrast enables the one or more darker marks formed upon the lightened area to be more easily and reliably read by optical scanning devices such as handheld optical scanners. This improved contrast also enables a plurality of spaced darker marks, such as those commonly used for part identification purposes, to be smaller and more closely spaced to reduce the overall size of the marking arrangement while maintaining the readability of the marking arrangement by an optical scanning device.

Moreover, because the darker marks are formed directly upon or through the lightened area, rather than being formed upon untreated polymeric material simply alongside the lightened area, adjacent edges of the lightened area and darker marks are always maintained in an abutting relationship. In other words, where the mark ends, the lightened area begins. The possibility of forming a mark 232 at a location slightly spaced from lightened area 230 and leaving an untreated portion of surface 126 between the lightened area and the mark (which may impair reading of the marking scheme) is eliminated. This further enhances the ability of system 10 to produce more closely spaced marks and a more compact marking scheme.

Figure 2:
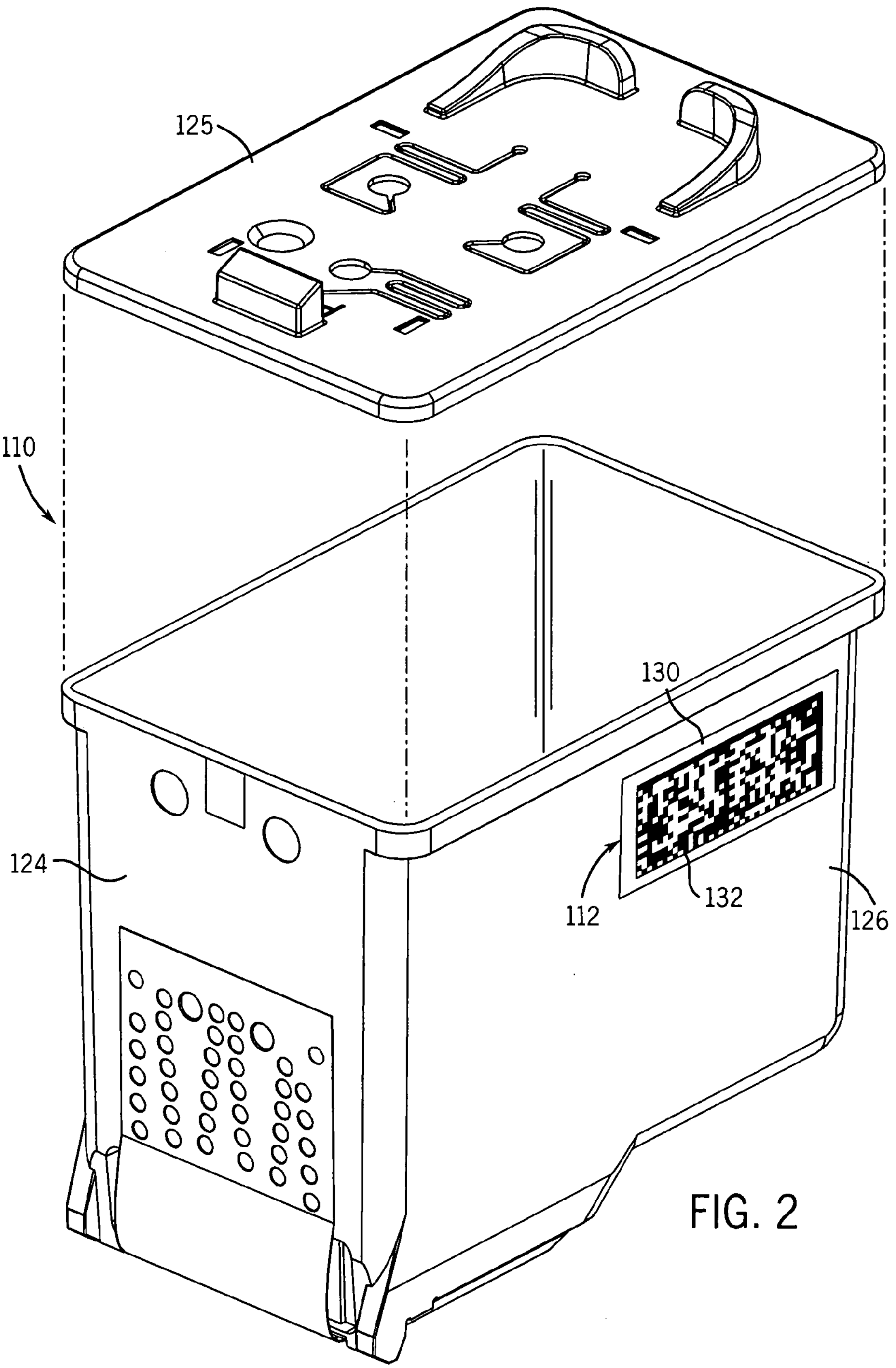
FIG. 2 is an exploded perspective view of an example of a part having a marking arrangement produced by the system of FIG. 1, according to an exemplary embodiment.

FIG. 2 is an exploded view of an example of part of a product 110 having a marking arrangement 112 produced by system 10 (shown in FIG. 1). In the particular example, product 110 comprises a print cartridge having a body 124 and a cover 125. Body 124 has an exterior surface 126 including one or more materials such that surface 126 has light absorption characteristics (color or darkness) that vary in response to laser-applied energy. In one particular embodiment, the entirety of body 124, which is configured to at least partially receive and surround a fluid ink, is integrally formed as a single unitary body out of the polymeric material. The polymeric material forming body 124 or at least upon which marking scheme 112 is located, includes a laser energy absorbing additive including, but not limited to, carbon black, graphite, zirconium silicates, calcium silicates, zeolite, cordierite, talc, kaolin or mica. In particular embodiments, body 124 may additionally include color agents, filler, flame retardants, ultraviolet stabilizers, antioxidants, impact modifiers, dispersants, plasticizers and the like. Although product 110 is illustrated as an ink cartridge, product 110 may alternatively comprise other plastic or polymeric articles that are extruded, molded or formed by other techniques.

Marking arrangement 112 is formed upon surface 126 and includes a lightened area 130 and a plurality of darkened marks 132. Lightened area 130 comprises an area of surface 126 which has been treated by a first laser beam 22 (shown in FIG. 1) such that the surface is lighter as compared to surrounding surface 126. Marks 132 comprise a plurality of spaced and contiguous marks formed upon lightened area 130 by a second laser beam 22. Marks 132 are generally formed by the laser beam applying energy to lightened area 130 such that portions of lightened area 130 are burnt or darkened in color. Marks 132 are configured to be read or otherwise detected by an optical scanning device. In one embodiment, marks 132 are configured to be read by an optical scanner having a focus of +/−600 micrometers. In the embodiment shown, marks 132 are configured to identify article or part 124 and/or product 110. In the embodiment shown, marks 132 comprise a matrix. In another embodiment, marks 132 may comprise a bar code. In another embodiment, marks 132 may comprise a series of alphanumeric symbols corresponding to the particular part 124 or product 110. Marks 132 identify part 124 or product 110, enabling the part or product to be accurately inventoried, tracked during manufacturing or shipping or tracked for point of sale. In particular embodiments, marks 132 may be configured to alternatively or additionally provide information about part 124 or product 110 such as pricing information, origination information or information relating to the particular characteristics of product 110.

Figure 3:
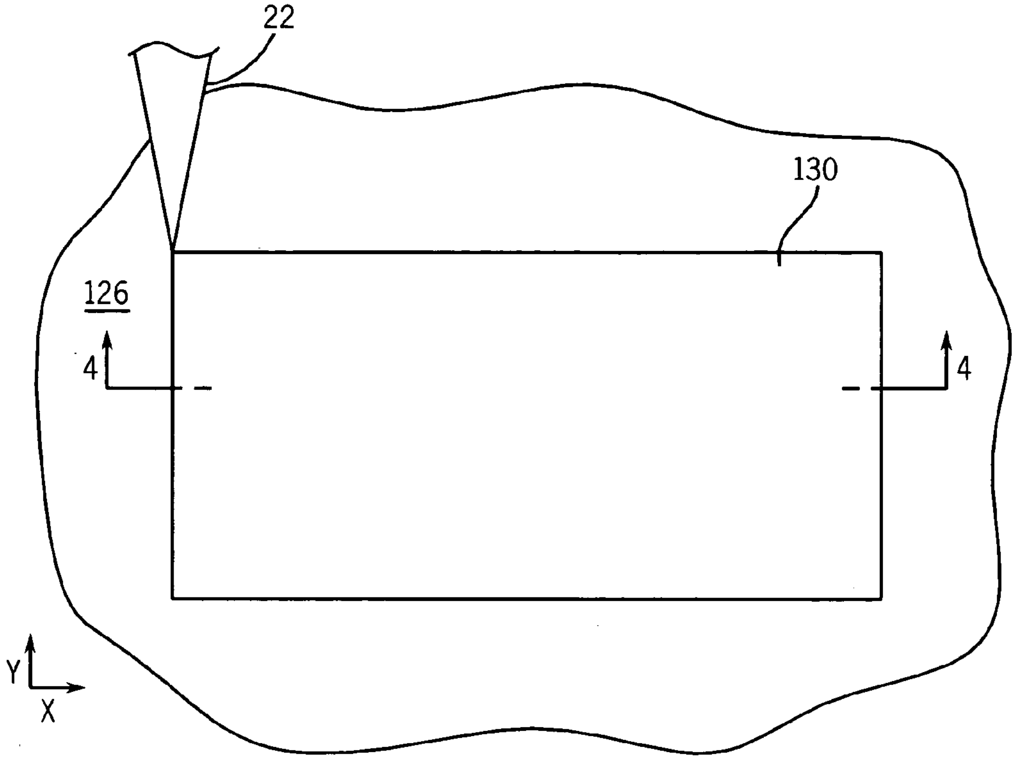
FIG. 3 is a fragmentary top plan view illustrating a first laser beam being directed upon a surface to form a lightened area, according to an exemplary embodiment.
Figure 4:
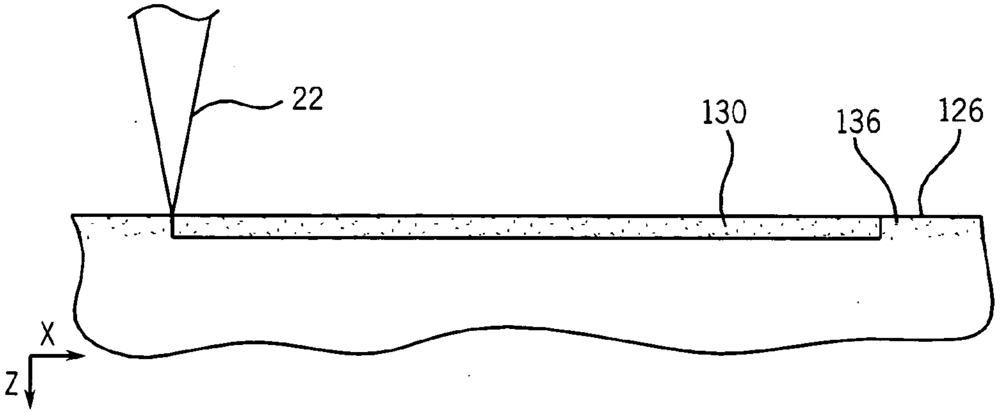
FIG. 4 is a sectional view of the surface and the lightened area of FIG. 3 taken along line 4—4, according to an exemplary embodiment.

FIGS. 3–6 illustrate an exemplary process or method for forming marking arrangement 112. As shown by FIGS. 3 and 4, the first laser beam 22 is directed upon surface 126. As shown by FIG. 4, surface 126 is formed from a polymeric material including laser energy absorbing additives. In one embodiment, surfaces 126 is formed from a polymeric material such as a liquid crystal polymer, wherein additives 136 comprise carbon black. As a result, surface 126 is black. In other embodiments, the polymeric material forming surface 126 may comprise polyester styrene or polyphenalsulfide, wherein additives 136 comprise carbon black.

As shown by FIGS. 3 and 4, at least one of the first laser beam 22 and part 124 is moved relative to the other such that laser beam 22 serpentines back and forth across surface 126 to obtain a fill. This may be achieved by moving laser beam 122 or by moving part 124. As shown by FIG. 4, laser beam 22 supplies energy to additives 136, causing additives 136 to decompose or become colorless. This lightened area 130 upon surface 126 serves as a background for darkened marks 132.

Figure 5:
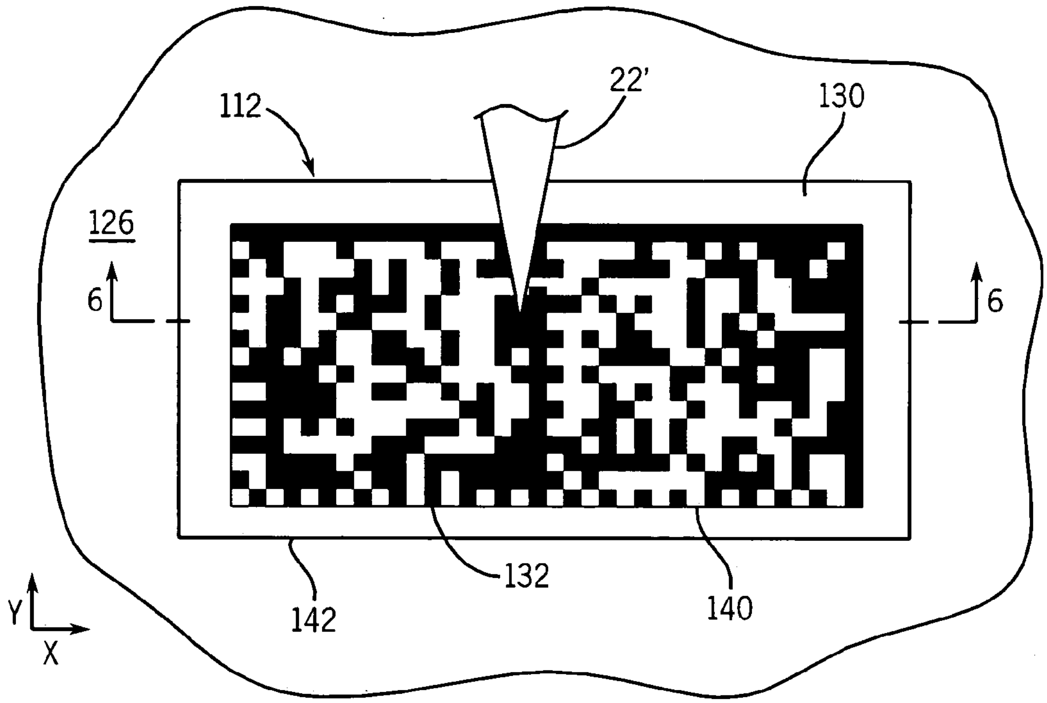
FIG. 5 is a fragmentary top plan view illustrating a second laser beam being directed upon the lightened area to form dark marks over the lightened area, according to an exemplary embodiment.
Figure 6:
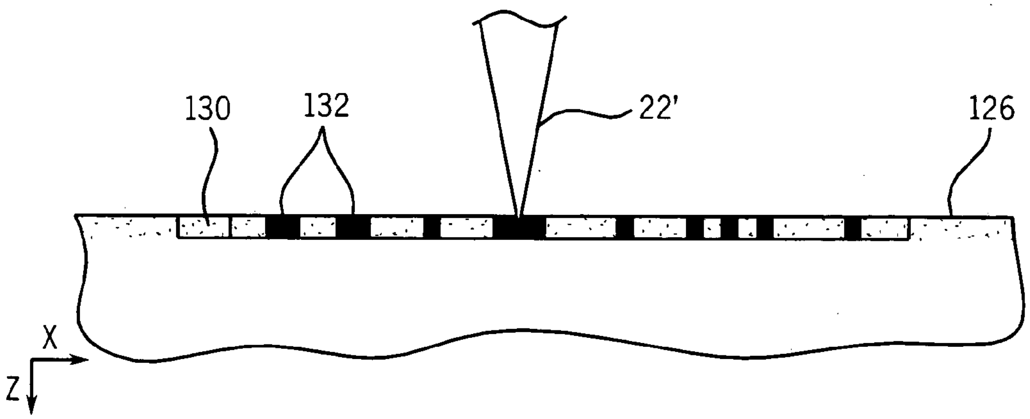
FIG. 6 is a sectional view of the lightened area and marks of FIG. 5 taken along line 6—6, according to an exemplary embodiment.

As shown by FIGS. 5 and 6, a second laser beam 22' is then directed over lightened area 130. The second laser beam 22' delivers a higher power density to selected portions of lightened area 130 as compared to the power density delivered by the first laser beam 22. As noted above, the higher power density delivered to lightened area 130 by the second laser beam 22' may be achieved by maintaining the energy density of laser beam 22' and increasing the time at which lightened area 130 is exposed to the second laser beam 22' as compared to the first laser beam 22. Alternatively, the greater power density delivered by the second laser beam 22' may be achieved by maintaining the time at which lightened area 130 is exposed to the second laser beam 22' and increasing energy density of energy density or fluence of the second laser beam 22' as compared to the first laser beam 22. In particular applications, both the exposure time and the energy density of the laser beam 22' may be increased as compared to laser beam 22. As a result, the power density applied to lightened area 130 causes the polymeric material within lightened area 130 along surface 126 to burn, causing the material that was previously bleached so as to be lighter than surrounding untreated portions of surface 126 to now be darker than the surrounding bleached portions. In particular embodiments, the material treated by the second laser beam 22' is burnt so as to also be darker than the surrounding untreated portions of surface 126. As shown by FIG. 5, marks 132 are configured as an identification matrix configured to be read by an optical scanning device which generates signals based upon the pattern or arrangement of the matrix formed by marks 132. The resulting signals generated by the optical scanning device are then analyzed by a processor built into the scanning device or provided by a separate device to identify the particular part 124 having marking arrangement 112.

As further shown by FIG. 5, marks 132 occupy a total mark area 140. Area 140 is inset from an outer perimeter 142 of lightened area 130 such that lightened area 130 extends beyond area 140 to provide a dead or quiet zone for the reader. In one embodiment, the quiet zone has a dimension of at least six pixels. Each pixel (in a 2D matrix mark) has a length from between about 50 to 500 microns. In other embodiments, the quiet zone may be larger or smaller depending upon the reader. As a result, an optical scanning device has enough white space to distinguish between the peripheral portions of marks 132 and those untreated portions of surface 126 about lightened area 130.

Figure 7:
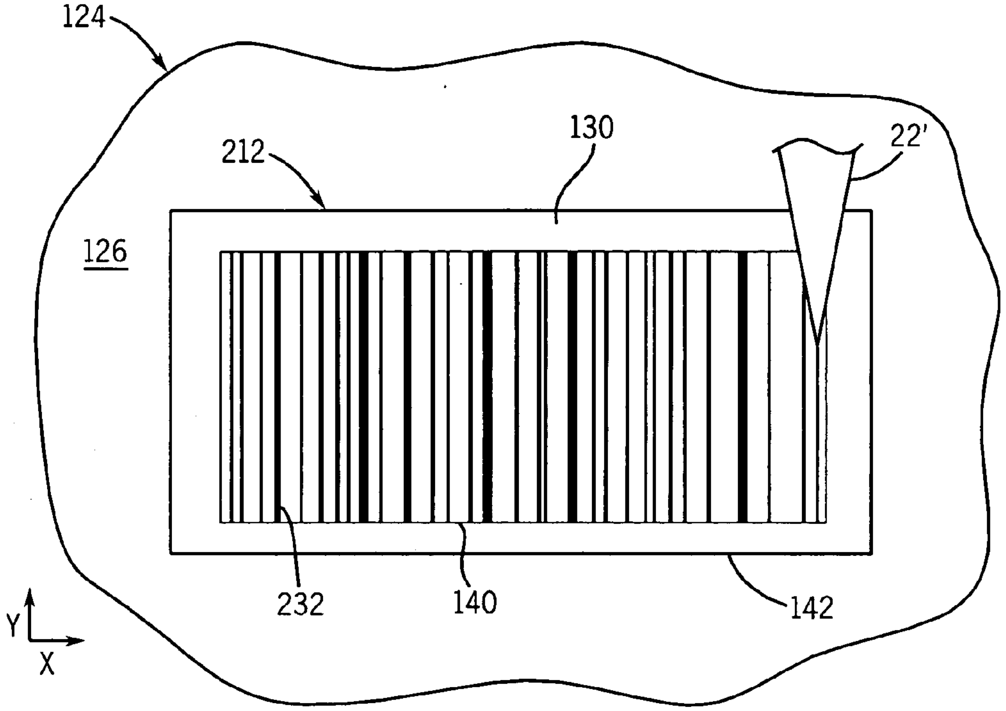
FIG. 7 is a fragmentary top plan view illustrating a laser beam directed upon a surface to form dark marks upon a lightened area, according to an exemplary embodiment.
Figure 8:
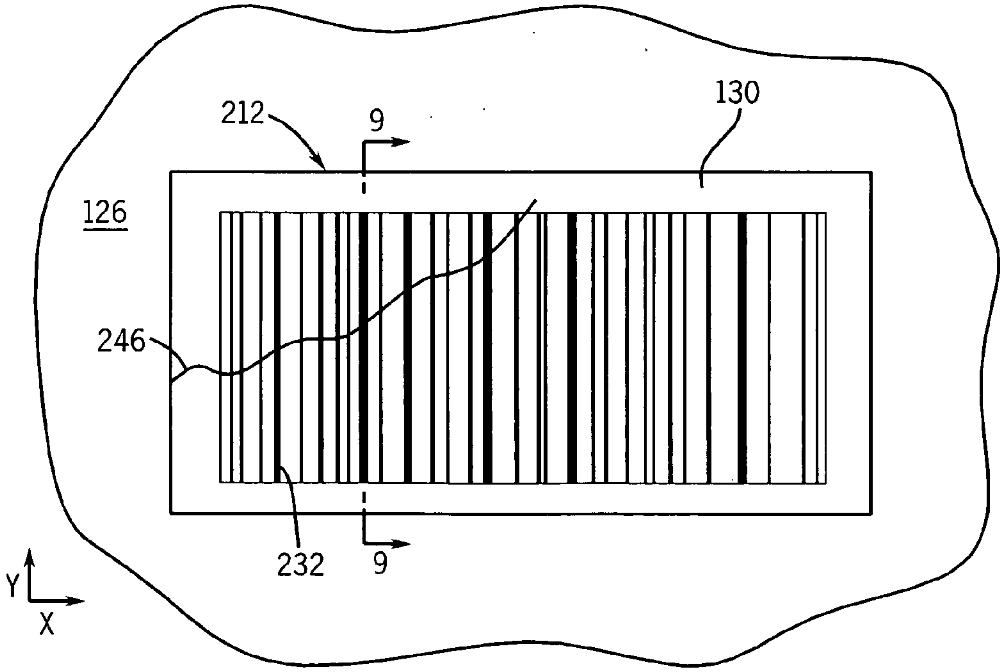
FIG. 8 illustrates the lightened area and marks of FIG. 7 further including a scratch, according to an exemplary embodiment.
Figure 9:
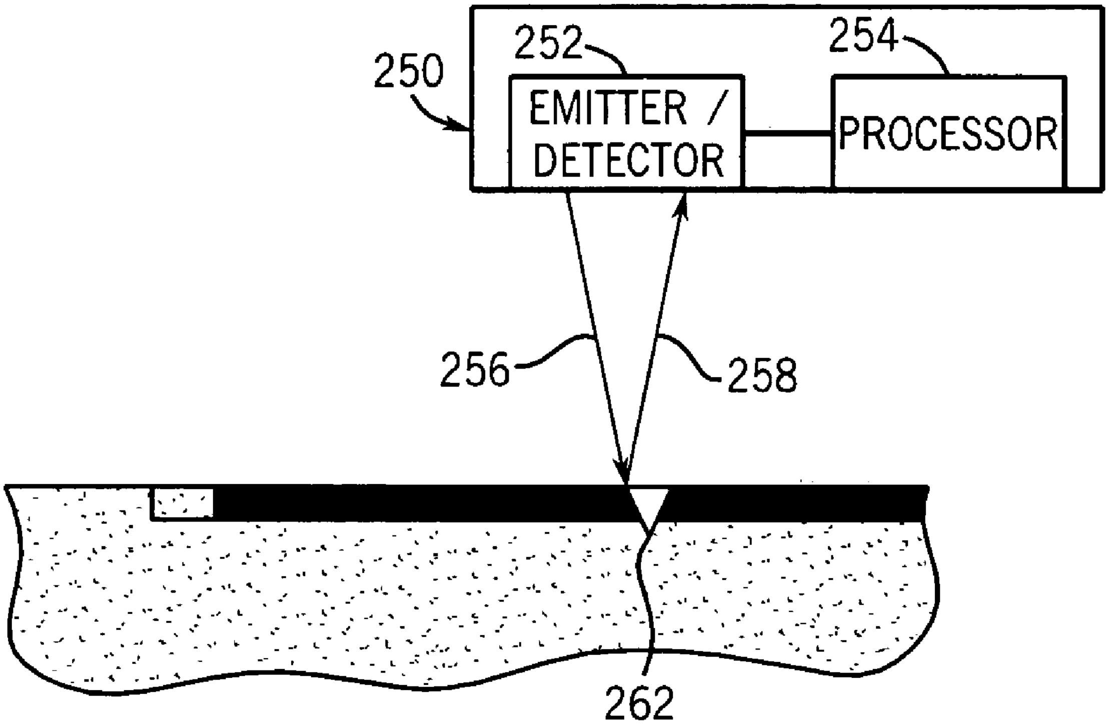
FIG. 9 is a sectional view of the marking scheme of FIG. 8 taken along line 9—9 while the marking scheme is being detected, according to an exemplary embodiment.

FIGS. 7–9 illustrate an alternative marking arrangement 212 formed upon surface 126 of part 124. Arrangement 212 is identical to arrangement 112 except that arrangement 212 includes marks 232 in lieu of marks 132. Marks 232 are identical to marks 132 except that marks 232 are formed by second laser 22' applying an energy density sufficient so as to cut through or otherwise remove portions of lightened area 130 to expose the underlying untreated polymeric material. In particular applications, the laser beam cuts into the untreated polymeric material such that the untreated polymeric material is charred or burnt so as to be darker than the untreated and unburnt polymeric material. In addition, marks 232 are configured as a series of spaced bars (commonly referred to as a bar-code). The width and spacing of the various bar-configurations of marks 232 are configured to be detected by an optical scanner, wherein the optical scanner generates signals which are analyzed to identify particular part 124.

FIGS. 8 and 9 illustrate the robust nature of marking arrangement 212. FIGS. 8 and 9 illustrate surface 126 additionally including a scratch 246 extending across a plurality of spaced marks 232. FIG. 9 also illustrates an optical scanning device 250, such as a handheld optical scanner. Scanning device 250 includes a photo emitter/detector 252 and a processor 254. The emitter detector emits an optical detection beam 256 which is reflected. The reflected beam 258 is detected by a detector portion of emitter/detector 252. Because the darkened bars 232 absorb more of optical detection beam 256, less light is reflected back to detector 252 as optical detection beam 258 as compared to intermediate portions of lightened area 130. As device 250 and marking scheme 212 are moved relative to one another, scanning device 350 detects the changes in reflected light which correspond to the pattern or arrangement of marks 232. This results in the generation of detection signals which are transmitted to processor 254 to identify part 124 based upon arrangement 212. In lieu of processor 254 being provided as part of optical scanning device 250, processor 254 alternatively may be provided as part of a separate device in communication with scanning device 250.

As shown by FIG. 9, scratch 246 does not substantially impair the ability of optical scanning device 250 to accurately read arrangement 212. Rather, scratch 246 further deepens the channel within lightened area 130 that was cut by the second laser beam 22' to form mark 232. The floor 262 of scratch 246 terminates deeper into the untreated polymeric material of part 124. As a result, the floor 262 of scratch 246 has substantially the same color or darkness as those unscratched portions of marks 232. Consequently, as part 124 and optical scanning device 250 are moved relative to one another, emitter/detector 252 receives the same amount of reflected light from an unscratched mark 232 as compared to a mark 232 with scratch 246. Thus, arrangement 212 is less susceptible to scratches or other damage which may prevent accurate reading of arrangement 212 as compared to previous marking arrangements wherein a scratch through a darkened mark would expose a lighter underlying polymeric material or a scratch through a laser induced light mark would expose a darker underlying polymeric material.

In those applications where marks 232 are alternatively formed by burning or charring portions of lightened area 230, rather than cutting through lightened area 230, floor 262 of scratch 246 shall expose the underlying polymeric material. While the underlying polymeric material is generally lighter than those unscratched portions of marks 232 which have been burnt, the underlying polymeric material is still darker than adjacent portions of lightened area 130, enabling detector 252 to still distinguish between the floor 262 of scratch 246 across mark 232 and adjacent lightened area 130.

Although the present invention has been described with reference to example embodiments, workers skilled in the art will recognize that changes may be made in form and detail without departing from the spirit and scope of the invention. Those skilled in the art will appreciate that certain of these advantages can be obtained separately through reconfiguring the foregoing structure without departing from the spirit and scope of the present invention. Because the technology of the present invention is relatively complex, not all changes in the technology are foreseeable. The present invention described with reference to the example embodiments and set forth in the following claims is manifestly intended to be as broad as possible. For example, unless specifically otherwise noted, the claims reciting a single particular element also encompass a plurality of such particular elements.

What is claimed is:

1. A method for marking a polymeric surface, the method comprising:

directing a first laser beam to form a lightened area on a surface; and directing a second laser beam upon the lightened area to form a first mark darker than the lightened area.

2. The method of claim 1 including burning a portion of the lightened area with the second laser beam to form the first mark.

3. The method of claim 1 including removing a portion of the lightened area with the second laser beam to expose raw polymeric material to form the first mark.

4. The method of claim 1, wherein the first laser beam has a first energy density and wherein the second laser beam has a second greater energy density.

5. The method of claim 1, wherein the first laser beam is moved across the surface at a first speed and wherein the second laser beam is moved across the lightened area at a second slower speed.

6. The method of claim 1, wherein the surface is moved relative to the first laser beam at a first speed and wherein the lightened area is moved relative to the second laser beam at a second slower speed.

7. The method of claim 1, wherein the first laser beam has a first duty cycle and wherein the second laser beam has a second greater duty cycle.

8. The method of claim 1 including directing the second laser beam upon the lightened area to form a second mark darker than the lightened area and spaced from the first mark.

9. The method of claim 8, wherein the first mark and the second mark are configured to be read by an optical scanning device.

10. The method of claim 8, wherein the first mark and the second mark are configured to be part of an identification matrix.

11. The method of claim 1, wherein the first mark is configured to be read by an optical scanning device.

12. The method of claim 1, wherein the first laser beam is configured to vaporize at least one additive along the surface.

13. The method of claim 1, wherein the at least one material includes carbon black.

14. The method of claim 1, wherein the surface is a polymeric material including carbon black.

15. The method of claim 1, wherein the first mark is contained within a total mark area and wherein the lightened area extends at least six pixels beyond the total mark area.

16. The method of claim 1, wherein the first laser beam is produced by a Q-switched Nd:YAG laser having a 1064 nanometer wavelength.

17. The method of claim 16, wherein the laser beam has a duty cycle of between about 10 kilohertz and about 100 kilohertz, a power of between about 1 watt and 50 watts and a scan speed of between about 100 millimeters per second and about 4,000 millimeters per second.

18. The method of claim 16, wherein the first laser beam has a first frequency of 60 kilohertz, a first power of 4.38 watts and a first scan speed of 1,500 millimeters per second and wherein the second laser beam has a second frequency of 60 kilohertz, a second power of 4.38 watts and a second scan speed of about 350 millimeters per second.

19. The method of claim 1, wherein the first laser beam has a wavelength of between about 1,000 nanometers and about 1,500 nanometers.

20. The method of claim 1, wherein the first laser beam is produced by a carbon dioxide laser having a wavelength of between about 9.2 micrometers and about 10.6 micrometers.

21. The method of claim 1, wherein the first laser beam and the second laser beam is generated by a common laser.

22. The method of claim 21, wherein the first laser beam has a first power and wherein the second laser beam has a second greater power.

23. A method for identifying parts having a polymeric surface, the method comprising:

directing a first laser beam on the surface to form a lightened area on the surface;

directing a second laser beam upon the lightened area to form a first mark darker than the lightened area;

moving at least one of the part and an optical scanner relative to one another, wherein the scanner produces signals based upon the first mark; and identifying the part based at least partially upon the signals produced by the optical scanner.

24. A method for identifying a part having a polymeric surface, the method comprising:

scanning a first mark formed on the polymeric surface by a first laser beam and a surrounding lightened area formed on the surface with a second laser beam.

* * * * *